United States Patent
Noda

(10) Patent No.: US 7,502,518 B2
(45) Date of Patent: Mar. 10, 2009

(54) APPARATUS AND METHOD FOR CODING IMAGE BASED ON LEVEL OF VISUAL ATTENTION AND LEVEL OF PERCEIVABLE IMAGE QUALITY DISTORTION, AND COMPUTER PROGRAM PRODUCT THEREFOR

(75) Inventor: Reiko Noda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 510 days.

(21) Appl. No.: 11/152,258

(22) Filed: Jun. 15, 2005

(65) Prior Publication Data
US 2005/0286786 A1 Dec. 29, 2005

(30) Foreign Application Priority Data
Jun. 17, 2004 (JP) .............................. 2004-179823

(51) Int. Cl.
*G06K 9/36* (2006.01)
(52) U.S. Cl. .................. 382/239; 382/232; 382/238
(58) Field of Classification Search ................ 382/232, 382/239, 251
See application file for complete search history.

(56) References Cited

U.S. PATENT DOCUMENTS

| | | | | |
|---|---|---|---|---|
| 5,291,282 | A * | 3/1994 | Nakagawa et al. | 375/240.23 |
| 6,272,177 | B1 * | 8/2001 | Murakami et al. | 375/240.03 |
| 6,295,375 | B1 * | 9/2001 | Andry | 382/232 |
| 6,792,152 | B1 * | 9/2004 | Shibata et al. | 382/239 |
| 7,274,741 | B2 * | 9/2007 | Ma et al. | 375/240.08 |
| 2002/0018646 | A1 * | 2/2002 | Nishi et al. | 386/109 |

FOREIGN PATENT DOCUMENTS

JP 10-164581 6/1998
JP 2003-284071 10/2003

OTHER PUBLICATIONS

Office Action issued by the Japanese Patent Office on Aug. 21, 2007, for Japanese Patent Application No. 2004-179823, and Partial English Translation of Office Action.
http://www.mpeg.org/MPEG/MSSG/tm5/Ch10/Ch10.html, "10 Rate Control and Quantization Control", Test Model 5 at MPEG.ORG.

* cited by examiner

*Primary Examiner*—Jingge Wu
*Assistant Examiner*—Amara Abdi
(74) *Attorney, Agent, or Firm*—Finnegan, Henderson, Farabow, Garrett & Dunner, L.L.P.

(57) ABSTRACT

An apparatus for coding an image includes a setting unit that sets quantization width for each coded block of an image frame of image data. The apparatus also includes a visual attention calculating unit that calculates a level of visual attention to a first element for each coded block of the image frame; and a perceptual distortion calculating unit that calculates a level of perceptual distortion of a second element whose distorted image quality is easily visually perceived, for each coded block of the image frame. The apparatus also includes a correcting unit that corrects the quantization width based on the level of visual attention and the level of perceptual distortion; and a quantizing unit that quantizes the image data based on the corrected quantization width.

5 Claims, 4 Drawing Sheets

APPARATUS AND METHOD FOR CODING IMAGE BASED ON LEVEL OF VISUAL ATTENTION AND LEVEL OF PERCEIVABLE IMAGE QUALITY DISTORTION, AND COMPUTER PROGRAM PRODUCT THEREFOR

CROSS-REFERENCE TO RELATED APPLICATIONS

This application is based upon and claims the benefit of priority from the priority Japanese Patent Application No. 2004-179823, filed on Jun. 17, 2004; the entire contents of which are incorporated herein by reference.

BACKGROUND OF THE INVENTION

1. Field of the Invention

The present invention relates to an apparatus for and method of coding an image, and more particularly to a technique to specify appropriate data of quantization width for quantization of a dynamic image or a static image.

2. Description of the Related Art

Conventional standards for motion-picture coding, such as ITU-TH.264, ISO/IEC MPEG-2, allow compression of high quality image through selection of the most appropriate coding mode or quantization parameter for each coded block, which is called a macroblock, according to the properties of the coded block.

More specifically, the most basic quantizing technique for image compression sets a smaller quantization step, which is a quantization parameter, for a macroblock which is determined to have a higher level of importance, and a larger quantization step for a macroblock which is determined to have a lower level of importance, thereby trying to achieve enhanced coding efficiency and improved image quality.

Proposals have been made to correct the quantization parameter in consideration of human visual characteristics. For example, "International Organisation for Standardisation TestModel Editing Committee, 1993. Test Model 5. April. ISO-IEC/JTC1/SC29/WG11/NO400" (hereinafter also referred to as first literature) proposes calculating an activity of an input image and correcting the quantization step so that the quantization step for flat areas is made smaller, considering the human visual characteristics that human visual system is more sensitive to distortions in flat areas.

Another image coding method utilizing a certain human perceptual characteristic is disclosed, for example, in Japanese Patent Application Laid-Open No. 2003-284071 (hereinafter also referred to as second literature). The method includes steps of conducting a modeling so that image quality lowers from a target area towards a background area, and correcting a quantization parameter according to the result of modeling.

Though the method described in the first literature intends to reduce quantization distortion in areas where attention of viewers tends to focus by setting a smaller quantization step for the flat area in the image frame, the area to which the viewer actually focuses attention is quite often not the flat area in the image frame. For example, if the image frame includes a human face image against a relatively flat background, the viewer is expected to focus more on the human face image rather than the flat background. In addition, the human visual characteristics allow men to perceive only a limited area in detail. Hence, for the enhancement of image quality, an area to which the viewer's attention focuses in the image frame needs to be prioritized. The method of the first literature, however, relatively increases the quantization step for the focused area, thereby deteriorating the subjective image quality of the focused area.

On the other hand, the method according to the second literature though enhances the image quality of the focused area by relatively decreasing the quantization step of the focused area, relatively increases the quantization step of the flat background thereby strengthening the quantization distortion in the flat background which is easily perceived. Thus, the method according to the second literature also deteriorates overall subjective image quality.

SUMMARY OF THE INVENTION

According to one aspect of the present invention, an apparatus for coding an image includes a setting unit that sets quantization width for each coded block of an image frame of image data; a visual attention calculating unit that calculates a level of visual attention to a first element for each coded block of the image frame; a perceptual distortion calculating unit that calculates a level of perceptual distortion of a second element whose distorted image quality is easily visually perceived, for each coded block of the image frame; a correcting unit that corrects the quantization width based on the level of visual attention and the level of perceptual distortion; and a quantizing unit that quantizes the image data based on the corrected quantization width.

According to another aspect of the present invention, a method for coding an image includes setting quantization width for each coded block of an image frame of image data; calculating a level of visual attention to a first element for each coded block of the image frame; calculating a level of perceptual distortion of a second element whose distorted image quality is easily visually perceived, for each coded block of the image frame; correcting the quantization width based on the level of visual attention and the level of perceptual distortion; and quantizing the image data based on the corrected quantization width.

According to still another aspect of the present invention, a computer program product causes a computer to perform the method according to the present invention.

DETAILED DESCRIPTION OF THE PREFERRED EMBODIMENTS

Figure 1:
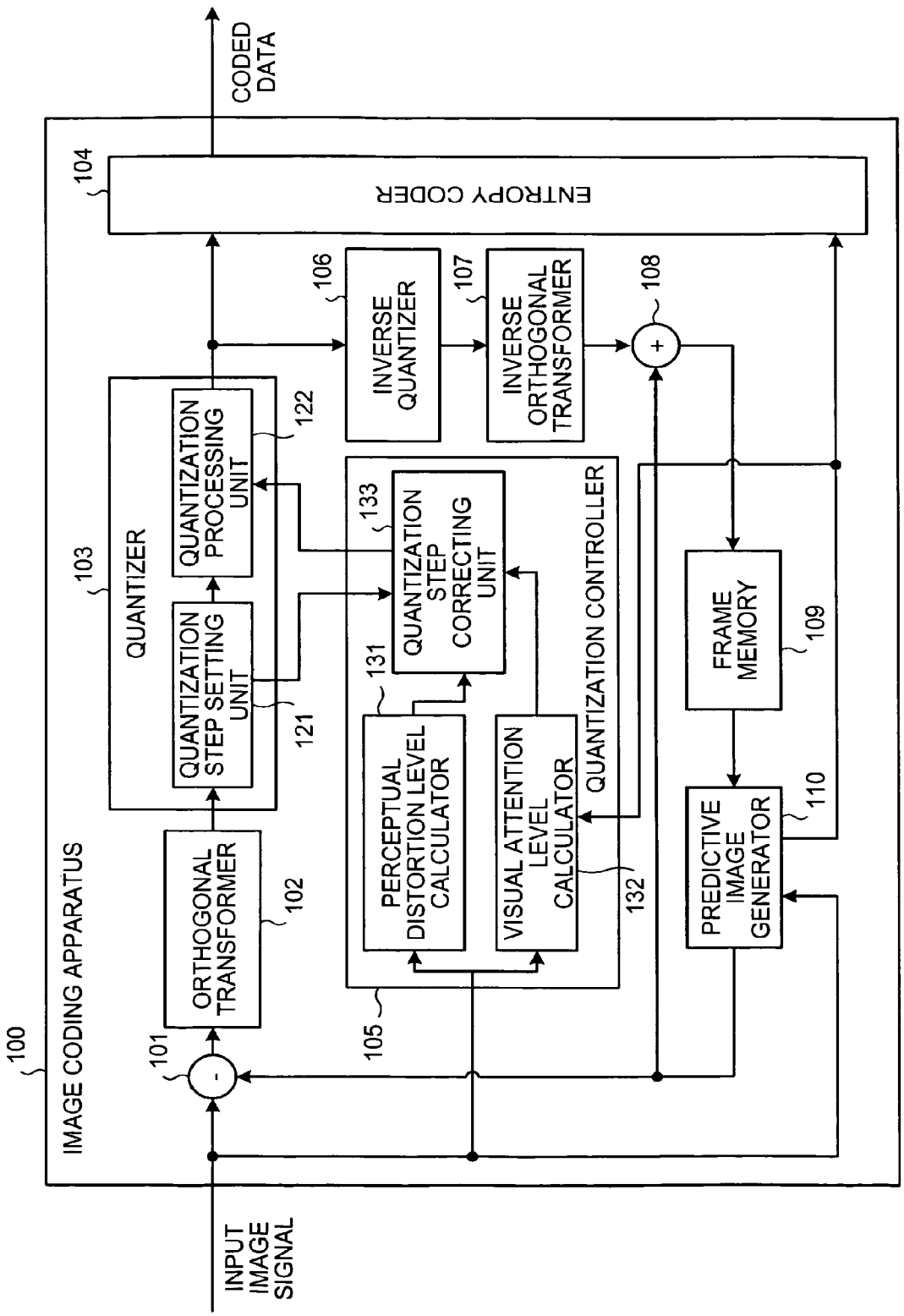
FIG. 1 is a block diagram of a structure of an image coding apparatus according to an embodiment.

FIG. 1 is a block diagram of a structure of an image coding apparatus 100 according to the embodiment. As shown in FIG. 1, the image-coding apparatus 100 includes a subtractor 101, an orthogonal transformer 102, a quantizer 103, an entropy coder 104, a quantization controller 105, an inverse quantizer 106, an inverse orthogonal transformer 107, an adder 108, a frame memory 109, and a predictive image generator 110. Here, an input image signal supplied to the image coding apparatus 100 is assumed to be a dynamic image signal on a frame-by-frame basis. The image coding apparatus 100 with the above described structure sequentially performs orthogonal transformation of the input image signal, quantization of the transformed signal, and coding of the quantized signal, thereby supplying coded data as a result of image signal coding. Process up to the coding is performed on a macroblock-by-macroblock basis. The macroblock corresponds to a coded block of the present invention.

The subtractor 101 finds a difference between the input image signal and a predictive image signal which is supplied from the predictive image generator 110 described later to generate a prediction error signal to be supplied to the orthogonal transformer 102.

The orthogonal transformer 102 performs orthogonal transformation on the prediction error signal generated by the subtractor 101 to generate transformation coefficient data of the orthogonal transformation (hereinafter also referred to as TC data) to be supplied to the quantizer 103. The transformation coefficients in the TC data concentrate in a low frequency range for each macroblock. Though discrete cosine transform (DCT) is employed for the orthogonal transformation in the embodiment, the present invention is not limited thereto.

The quantizer 103 includes a quantization step setting unit 121 and a quantization processing unit 122, and quantizes the TC data (transformation coefficients) so that high frequency components in the TC data are deleted from the data of each macroblock. Further, the quantizer 103 exchanges quantization step data with the quantization controller 105 for quantization. The quantizer 103 supplies the quantized TC data to the entropy coder 104 and the inverse quantizer 106. Next, the quantization step setting unit 121 and the quantization processing unit 122 in the quantizer 103 are described.

The quantization step setting unit 121 corresponds to a setting unit of the present invention and sets a step size (hereinafter also referred to as quantization step) or the like to be employed for the quantization of transformation coefficients of each macroblock included in the TC data supplied from the orthogonal transformer 102. The set quantization step is output as quantization step data. The quantization step corresponds to quantization width of the present invention.

The quantization processing unit 122 corresponds to a quantizing unit of the present invention, and quantizes TC data supplied from the orthogonal transformer 102 by dividing the same with a quantization step corrected according to the quantization step data supplied from the quantization controller 105 described later and rounding the reminder.

The quantization controller 105 includes a perceptual distortion level calculator 131, a visual attention level calculator 132, and a quantization step correcting unit 133. The quantization controller 105 analyzes the quantization step data supplied from the quantization step setting unit 121 regarding the received input image signal or motion vector data described later, calculates a level of perceptual distortion which indicates an easiness of perception of image distortion by a viewer and a level of visual attention which indicates a degree of attention paid by the viewer, corrects the quantization step based on the level of perceptual distortion and the level of visual attention, and outputs the result. Through the correction, distortions caused by coding become less noticeable and the image quality of a block to which the viewer is likely to focus attention is improved. Next, the perceptual distortion level calculator 131, the visual attention level calculator 132, and the quantization step correcting unit 133 will be described.

The perceptual distortion level calculator 131 corresponds to a perceptual distortion calculating unit of the present invention, and divides the input image signal supplied on a frame-by-frame basis into signals on a macroblock-by-macroblock basis, and calculates the level of perceptual distortion of each macroblock.

The easiness of perception of distorted image quality caused by the coding is a variant of image property. For example, quantization distortion is more easily perceived in a flat area than in an area with a relatively complicated image pattern. Hence, in the embodiment, an activity indicating a degree of complexity of the image in the macroblock is used to indicate the level of perceptual distortion. The calculation of the activity which indicates the level of perceptual distortion will be described later. The activity corresponds to an element whose distorted image quality is easily visually perceived by the viewer of the present invention.

The visual attention level calculator 132 corresponds to a visual attention calculating unit of the present invention, and divides the input image signal supplied on a frame-by-frame basis into signals on a macroblock-by-macroblock basis, and calculates for each macroblock the level of visual attention which is a numerical indication of a degree of viewer's visual attention based on the input image signal and motion vector data supplied from the predictive image generator 110. Calculation of the level of visual attention will be described later in detail. In the embodiment, the input image signal and the motion vector data are employed for the calculation of the level of visual attention. However, the level of attention may be calculated based on one of the input image signal and the motion vector data.

In the embodiment, areas to which the viewer focuses attention are identified according to the following features:

(1) focal level (here, focal level means a degree of focusing): an area with a higher focal level than other areas is identified as a focused area;

(2) coloring: an area which includes a special color or a different color from other areas is identified as a focused area;

(3) position in the image frame: an area closer to the center of the image frame is identified as a focused area; and (4) motion: an area with a different kind of motion vector from other areas is identified as a focused area.

Values indicating such features, i.e., the focal level, the coloring, the position in the image frame, and the motion are calculated, and employed as the levels of visual attention. A specific manner to calculate the levels of attention based on the focal level, the coloring, the position in the image frame, and the motion, and a specific manner to calculate a general level of visual attention based on respective calculated levels of visual attention will be described later. Each of the focal level, the coloring, the position in the image frame, and the motion corresponds to an element whose distorted image quality is easily visually perceived in the present invention.

In the embodiment, the focal level, the coloring, the position in the image frame, and the motion are each calculated as the level of visual attention for each macroblock. However, the calculation of the level of attention is not limited to be based on the features as mentioned above, and any features indicating the degree of visual attention may be employed. Alternatively, some of the features as mentioned above may be selected for the calculation of the level of visual attention, or values indicating other physical features may be employed.

The quantization step correcting unit 133 corresponds to a correcting unit of the present invention, and reduces the coding distortion which is easily perceived by the viewer for each macroblock, corrects the quantization step of the quantization step data supplied from the quantization step setting unit 121 according to the level of perceptual distortion and the level of visual attention so as to improve the image quality of a block which is supposed to be focused, and outputs the corrected quantization step as the quantization step data.

In the embodiment, the quantization step correcting unit 133 considers not only the level of visual attention but also the level of perceptual distortion at the correction of the quantization step. Conventionally, the correction is performed only with the level of visual attention. However, when an image includes a flat area, i.e., an area whose distorted quality is easily perceived, as a background which is in general not likely to be focused, some inconveniences arise. The conventional correction relatively decreases the quantization step of a macroblock with a higher level of visual attention in the frame, whereas relatively increases the quantization step of a macroblock with a lower level of visual attention in the frame. As a result, an image distortion in a flat area which tends to be focused in a non-target area is strengthened. The quantization step correcting unit 133 according to the embodiment prevents such highlighting of distorted image quality by correcting the quantization step based on both of the level of visual attention and the level of perceptual distortion, whereby the enhancement in image quality is allowed.

The inverse quantizer 106 inversely quantizes the quantized TC data supplied from the quantizer 103 by multiplying the same with the quantization step on a macroblock-by-macroblock basis.

Following the inverse quantization by the inverse quantizer 106, the inverse orthogonal transformer 107 further inversely orthogonally transforms the data supplied from the inverse quantizer 106 to output the resulting data to the adder 108.

The adder 108 adds the predictive image signal to the data supplied from the inverse orthogonal transformer 107 to generate a local decoding image signal which is supplied to the frame memory 109.

The frame memory 109 stores the local decoding image signal supplied from the adder 108.

The predictive image generator 110 matches (i.e., performs block matching, for example) the input image signal and the local decoding image signal stored in the frame memory 109 on a macroblock-by-macroblock basis, to find a match with smallest difference in motion vector, and compensate a local decoding image signal with the found motion vector to generate a predictive image signal. The predictive image generator 110 outputs the predictive image signal together with data of the found motion vector and a prediction mode at the compensation.

The entropy coder 104, utilizing deviation in probability of appearance of the input image signal, compresses (i.e., performs entropy coding) the quantized TC data supplied from the quantizer 103, and the motion vector data and the prediction mode data supplied from the predictive image generator 110. The entropy coder 104 outputs the compressed coded data to a transmission system or to an accumulation system (either not shown). Though a variable length coding is employed for compression in the embodiment, the present invention is not limited thereto.

Next, the image coding process from the reception of the input image signal up to the output of coded data by the image coding apparatus 100 with the above-described structure according to the embodiment is described with reference to FIG. 2.

The subtractor 101 finds the difference between the received input image signal and the predictive image signal supplied from the predictive image generator 110 to generate and output the prediction error signal (step S201). Generation of the predictive image signal supplied from the predictive image generator 110 will be described later.

The orthogonal transformer 102 orthogonally transforms the supplied prediction error signal to output the result as the TC data (step S202).

The quantizer 103 qauntizes the supplied TC data to output the result as quantized TC data (step S203). The quantizer 103 exchanges the quantization step data including the data of quantization step size with the quantization controller 105, to quantize the TC data using the corrected quantization step supplied from the quantization controller 105. Operations by the quantizer 103 and the quantization controller 105 will be described later in detail.

The entropy coder 104 performs entropy coding on the quantized TC data supplied from the quantizer 103 and the motion vector data and the prediction mode data supplied from the predictive image generator 110, to output the result as coded data (step S204). Generation of the motion vector data and the prediction mode data will be described later. According to the process as described above, the data can be quantized and coded based on the level of visual attention and the level of perceptual distortion. The coding process sequence is not limited to the embodiment described above.

Figure 2:
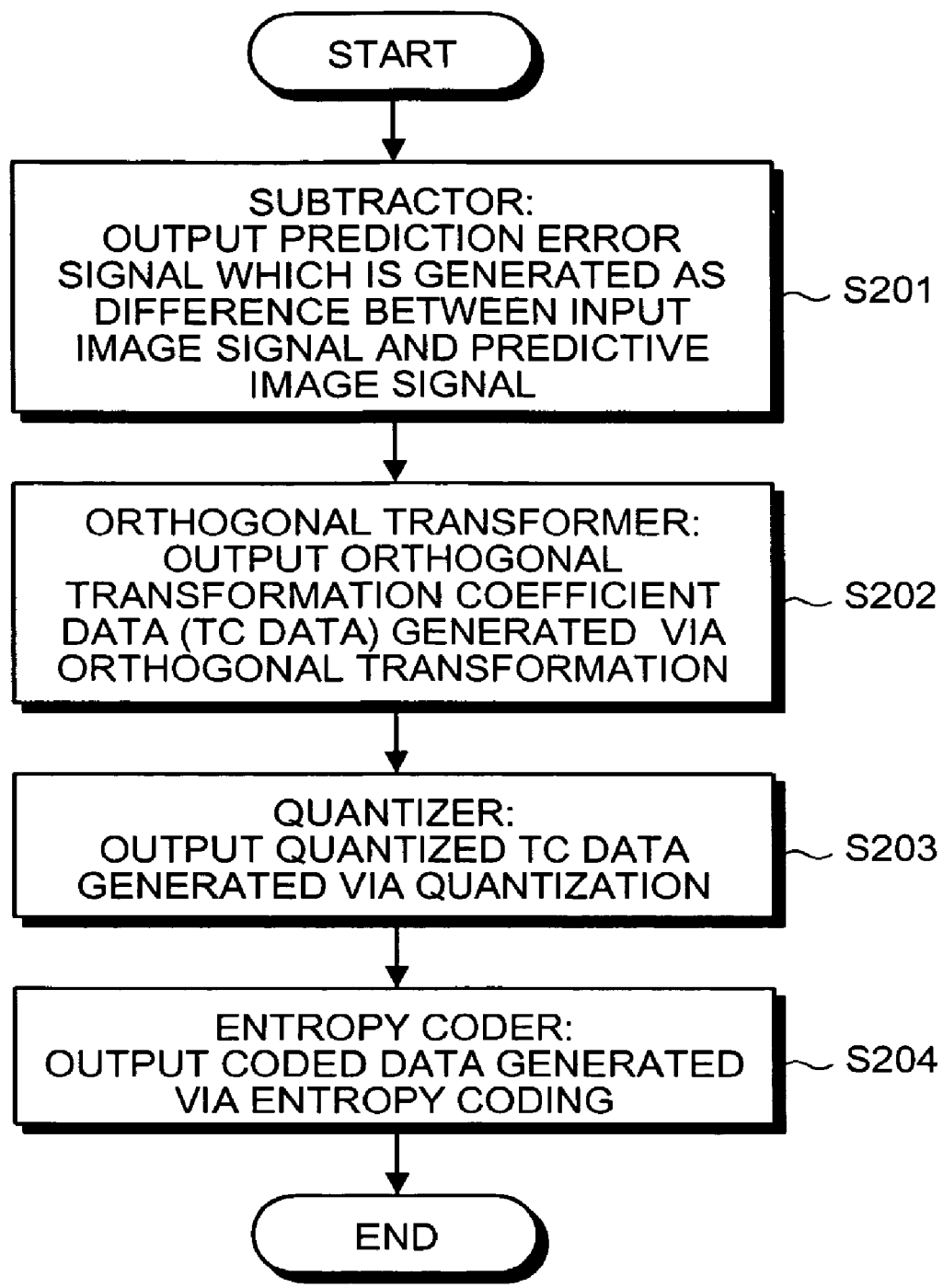
FIG. 2 is a flowchart of an overall process performed by the image coding apparatus according to the embodiment, from reception of an input image signal up to output of coded data.
Figure 3:
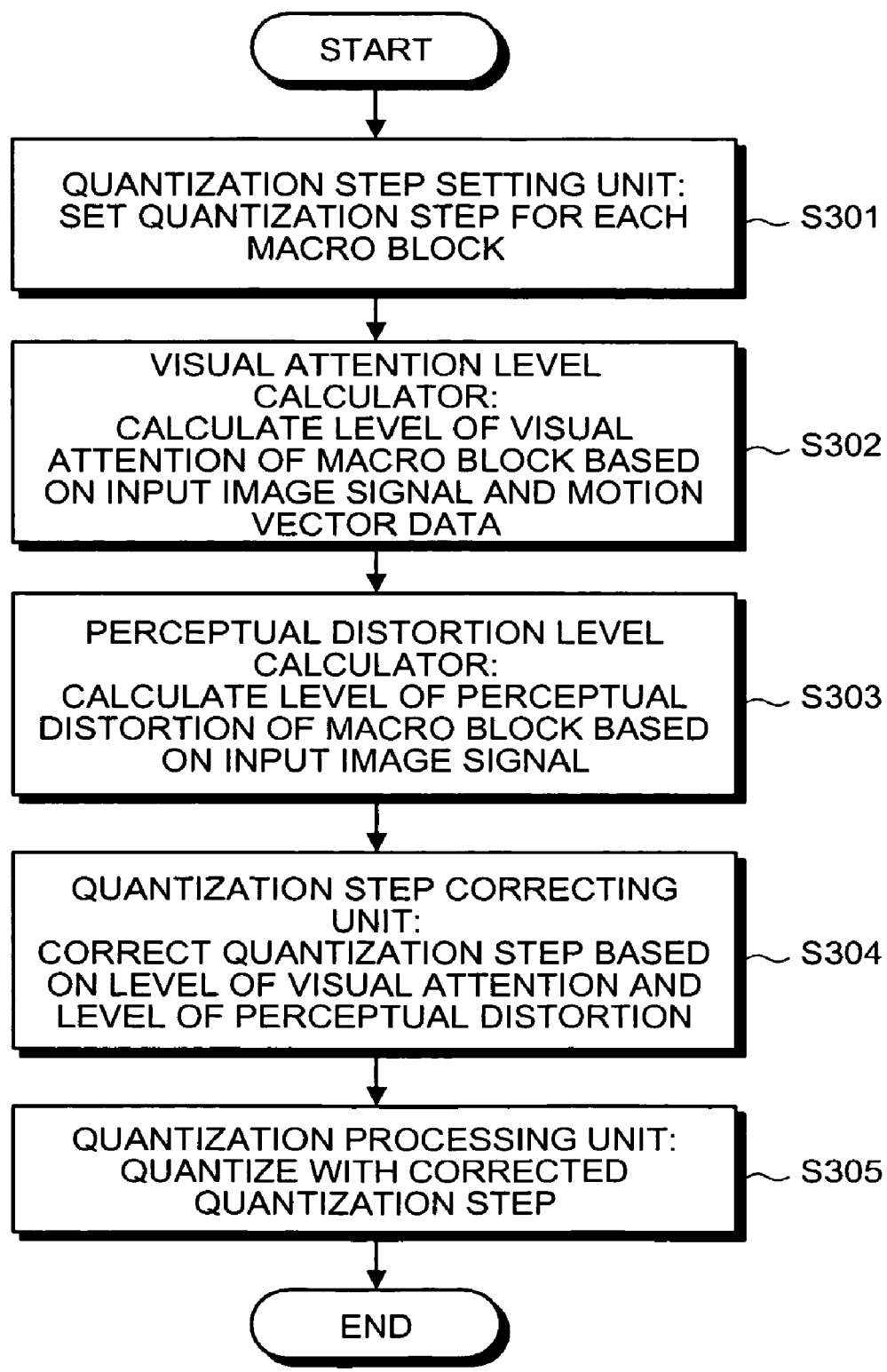
FIG. 3 is a flowchart of an overall process of quantization performed by the image coding apparatus according to the embodiment, up to quantization of data including data of transformation coefficient supplied from a quantizer and a quantization controller.

Next, quantization of the TC data by the quantizer 103 and the quantization controller 105 in step S203 of FIG. 2 is described. FIG. 3 is a flowchart of an overall process of the quantization of the TC data by the quantizer 103 and the quantization controller 105 of the image coding apparatus according to the embodiment.

The quantization step setting unit 121 sets the quantization step for dividing each piece of the supplied TC data on macroblock-by-macroblock basis, and outputs the'set quantization step as the quantization step data (step S301).

The visual attention level calculating unit 132 calculates the level of visual attention of the macroblock based on the input image signal and the motion vector data (step S302). As described above, specific features to which the viewer pays attention in the image are the focal level, the coloring, the position in the image frame, and the motion in the embodiment. The level of visual attention is calculated with respect to each of these features and then the general level of visual attention is calculated based on respective levels of visual attention.

First, calculation of a level of visual attention b regarding the focal level is described. Generally it is assumed that luminance substantially changes between adjacent pixel locations at a certain position in a focused area of the image. Hence, when there is a sudden change in the luminance in the macroblock, the macroblock is assumed to be in focus, and the value indicating the focal level becomes higher.

The level of visual attention b of the macroblock is calculated by Expression (1):

$$b = (d - d_{min})/(d_{max} - d_{min}) + 1 \qquad (1)$$

The character "d" denotes a maximum value of luminance difference between adjacent pixel locations in the pertinent macroblock. The characters "$d_{min}$" and "$d_{max}$", respectively denote a minimum value and a maximum value of "d" in each frame. According to Expression (1), the value b increases as the maximum value d, i.e., the luminance difference between the adjacent pixel locations increases. In other words, b takes a relatively larger value in a focused area than an area out of focus in each frame.

The manner of calculation of the focal level in the present invention is not limited to the one described above where the focal level is calculated based on the maximum luminance difference between adjacent pixel locations in each macroblock. Calculation can be conducted in different manners, for example, the focal level can be calculated based on a self correlation of pixel luminance in the block, a high frequency component among the transformation coefficients, or the like.

Next, calculation of the level of visual attention regarding the coloring is described. The viewer pays attention to the coloring, when the image contains a specific eye-catching color, such as red or flesh color or when there is a notable difference in colors in the pertinent frame, for example, the frame contains a color which is largely different from an average color in the frame. In an example describe below, the level of visual attention is calculated with respect to each color, i.e., red (r), flesh color (sk), and with respect to the difference with an average color in the frame (cd).

The level of visual attention r regarding red color is set based on value V and color saturation S of an average color value of pixels in a block represented in HSV color model. For example, r is two (r=2) if value V>0.7 and color saturation S>0.5, and otherwise r is one (r=1). Value V and color saturation S are each between zero and one inclusive.

The level of visual attention sk regarding flesh color is set based on hue H of an average color value of pixels in a block represented in HSV color model. For example, if $0<H<(\pi/6)$, the color is determined to be flesh color and sk is set to two (sk=2), otherwise sk is set to one (sk=1). Hue H takes values between zero and $2\pi$ inclusive.

The level of visual attention cd regarding the difference with an average color of the frame is set as follows. First, a value $C_{frame\_av}$ which indicates the average color value of the pixels in the frame and is represented by L*a*b color model, and a value $C_{block\_av}$ which indicates an average color value of the pixels in the macroblock and is represented by L*a*b color model are calculated. Then the difference between $C_{block\_av}$ and $C_{frame\_av}$ in the L*a*b space is calculated based on Expression (2):

$$c=\|C_{block\_av}-C_{frame\_av}\| \quad (2)$$

The value of c is calculated for all blocks in the frame. The minimum value of c in the frame and the maximum value of c in the frame are denoted respectively as $c_{min}$ and $c_{max}$.

The level of visual attention of the block is calculated based on the color difference with the average color for each frame according to Expression (3):

$$cd=(c-c_{min})/(c_{max}-c_{min})+1 \quad (3)$$

In the embodiment, the level of visual attention regarding the color is realized with red and flesh color selected as specific colors attracting viewer's attention. The color to be employed, however, is not limited to the two colors specifically mentioned, and the level of visual attention can be determined based on other colors. Calculation based on the color difference is not limited to the one described above where the larger color difference between the average color in the pertinent macroblock and the average color in the frame in the L*a*b space corresponds with a higher level of visual attention. Alternatively, the level of visual attention may be calculated based on the color difference with an average color in an adjacent block, for example. In addition, the calculating manner of the level of visual attention is not limited to the one based on a specific color or the one using the color difference with adjacent area, and any manner which allows calculation of a degree of visual attention based on coloring features can be employed.

Next, a method of calculating the level of attention p regarding the position in the image frame is described. Since the level of visual attention p is considered to be higher at a closer position to the center of the image frame, the level of visual attention p is calculated based on the distance from the center of the image frame. Here, the level of visual attention regarding the position in the image frame is found for each frame.

For example, the level of visual attention p is calculated based on Expression (4):

$$p=2-(l-l_{min})/(l_{max}-l_{min}) \quad (4)$$

Here, l represents a distance from the center of gravity of the macroblock and the center of the image frame, lmax represents a maximum value of l in the frame, and $l_{min}$ represents a minimum value of l in the frame. When the level of visual attention p is sought based on Expression (4), it is understood that p decreases linearly according to the distance of the center of gravity of the pertinent macroblock from the center of the image frame. Here, the level of visual attention regarding the position in the image frame may be calculated in any manner as far as the level of visual attention is associated with the position in the image frame, and the calculation based on Expression (4) described above is not a limiting example.

Next, calculation of the level of visual attention mv regarding the motion in the macroblock is described. The motion vector data supplied from the predictive image generator 110 is employed for the calculation of the level of visual attention mv regarding the motion in the macroblock. First, the magnitude s of the motion vector is calculated based on Expression (5) from the motion vector v of the pertinent macroblock:

$$s=\|v\|+\alpha \quad (5)$$

Here, a is a value added to accommodate deviation in dispersion of men's points of attention in camera work. For example, it is known that when the camera is in a zoom-in operation, the men's points of attention concentrate in the center of the zoom. Hence, in the zoom-in operation, p in Expression (4) can be adopted as the value a so that the level of visual attention increases as the distance from the center decreases. In operations other than the zoom-in, the value a is set to zero (a=0). Here, the value a may be set according to operations other than the zoom-in operation and the above described is not a limiting example.

Then, the value s is calculated for every block in the frame according to Expression (5), and the maximum value of s in the frame is represented as $s_{max}$, and the minimum value of s in the frame as $s_{min}$. Based on these values, the level of visual attention mv regarding the motion in the macroblock is calculated according to Expression (6):

$$mv=(s-s_{min})/(s_{max}-s_{min})+1 \quad (6)$$

The level of visual attention mv regarding the motion in the macroblock, found based on Expression (6), varies linearly according to the degree of motion in the macroblock.

Here, the calculation regarding the motion in the macroblock is not limited to the example described above, in which the calculation is based on the motion vector data supplied from the predictive image generator 110. For example, it may be possible to set an affine parameter which approximates the pertinent input image signal to an affine transform of the input image signal of the previous frame; compensate the motion of the input image signal of the previous frame; and find the motion vector based on the block matching. This means to detect a motion vector which does not include a global motion of the image caused by respective camera work. The value of a as mentioned above may be set based on the coefficient of the affine parameter. Alternatively, the value of a may be set according to the direction histogram of the motion vector of the macroblock included in a unit such as a frame, a field, or a slice.

Then, the general level of visual attention G of each macroblock is calculated based on the levels of visual attention sought as described above. First, the value of g which represents the degree of visual attention of each block is sought according to Expression (7), based on the levels of visual attention for focal level, coloring, position, and motion sought for each macroblock:

$$g=(b \times mv \times r \times cd)^{\wedge}(1/4)+sk+p \qquad (7)$$

In Expression (7), the levels of visual attention sk and p respectively regarding the flesh color and the position, are considered to be more important. The value of g, which represents the degree of visual attention for each block, is sought as a sum of geometric means of the levels of visual attention b, mv, r, and cd, concerning respectively with focal level, motion, red color, and color difference, and sk and p. The calculation intends to accommodate human visual characteristics that attention is focused particularly on a flesh color area or a central area of the image frame when the image is of a man. According to Expression (7), the correction of the quantization step is allowed with particular focus on the levels of visual attention regarding flesh color and position. Here, the manner of calculation is not limited to the one based on Expression (7). Other method may be adoptable, for example, based on the average of the all levels of visual attention.

Based on Expression (7), the value of g is calculated for every block in the frame, the maximum value of g is represented as $g_{max}$, and the minimum value of g represented as $g_{min}$. Based on these values, the general level of visual attention G of the pertinent macroblock is calculated according to Expression (8):

$$G=(g-g_{min})/(g_{max}-g_{min})+1 \qquad (8)$$

According to Expression (8), a value obtained through the scaling of g within the range of zero to one for each frame represents the general level of visual attention G of the macroblock.

Here, the manners of calculation of respective levels of visual attention and the general level of visual attention are not limited to those using the expressions described above. For example, an expression according to which the level of visual attention decreases non-linearly may be adopted instead of the expression described above according to which the level of visual attention decreases linearly. Alternatively, a value which represents other physical feature which is a parameter of the degree of visual attention may be calculated according to another expression to be used for the calculation of the general level of visual attention G. Though in the above description, the respective levels of visual attention or the general level of visual attention are scaled for each frame, those levels may be scaled for each frame or on for each slice.

Next, the perceptual distortion level calculator 131 calculates the level of perceptual distortion of the macroblock based on the input image signal (step S303). As described above, the activity $N\_act$, which represents the complexity of the image pattern, is employed to indicate the level of perceptual distortion of the macroblock in the embodiment. Hence, the value of activity $N\_act$ is first calculated.

First, the value of "act" is found as a sum of one and Vy which is the variance of the input image signal of the pertinent macroblock. Then, the activity $N\_act$ is calculated based on Expression (9):

$$N\_act=(A \times ct+ave\_act)/(act+A \times ave\_act) \qquad (9)$$

Here, $ave\_act$ represents the average value of act for each frame, and A represents a constant employed for the scaling of $N\_act$ into the range of 1/A to A. The value of A is set so that the quantization step can be suitably corrected with a coefficient GA described later. Specifically, A may be 1.5 (A=1.5), though the embodiment is not limiting the value of A to 1.5.

Here, $ave\_act$, which is the average value of act for each frame, is employed for the scaling. However, the reference value for the scaling is not limited to the $ave\_act$, and any value can be employed as $ave\_act$ as far as the value serves as the reference for the scaling.

When the activity $N\_act$ is calculated according to Expression (9), the activity $N\_act$ takes a smaller value than one when the variance of the input image of the pertinent macroblock is less than average, i.e., the image pattern is relatively flat. Contrarily, the activity $N\_act$ takes a larger value than one when the variance of the input image of the pertinent macroblock is more than average, i.e., the image pattern is relatively complicated. The activity $N\_act$ corresponds to the level of perceptual distortion in the present invention.

Though the luminance variance is employed for the calculation of activity in the embodiment, the above is not a limiting example. Alternatively, the activity may be calculated based on edge intensity, sum of differences between the luminance of a pixel in the macroblock under process and the luminance of a corresponding pixel in a reference image. Here, the reference image means image of a temporally previous frame, or a predictive image signal supplied from the predictive image generator 110. Alternatively, the pixel location corresponding to the reference image may be calculated based on the motion vector data supplied from the predictive image generator 110. Still alternatively, an affine parameter which approximates the input image signal to the affine transformation of the input image signal of the previous frame may be set as the sum of differences; the input image signal of the previous frame may be compensated in motion by the affine parameter; and the result of block matching for calculating the motion vector may be employed. The edge intensity of the macroblock can be calculated as the sum or the average of the edge intensity of pixels.

The quantization step correcting unit 133 corrects the quantization step set in step S301 based on the level of visual attention calculated in step S302 and the level of perceptual distortion calculated in step S303 (step S304).

Here, G is a value obtained via the scaling in the range of zero to one. For the simplicity of the following description, G is converted into a variable G', which may fluctuate in the range of ±0.5 around one, according to Expression (10):

$$G'=1.5-G \qquad (10)$$

Here, G' obtained via Expression (10) takes a smaller value than one in a block with a higher level of visual attention than other blocks, and takes a larger value than one in a block with a lower level of visual attention than other blocks. Here, G' corresponds to the level of visual attention in the present invention.

The value G obtained via the scaling into the range of zero to 1.0 according to Expression (8) may be converted in other manners than the one described above in which G is converted around the value one according to Expression (10). For example, G' may be calculated based on Expression (11) with a value $g_{base}$.

$$G'=(A \times g+g_{base})/(g+A \times g+g_{base}) \qquad (11)$$

Then, G' may be directly scaled around one. Further, the average of g for each frame may be employed as $g_{base}$. Specifically, A may takes a value two (A=2), though the embodiment does not limit A to such a value.

Next, the coefficient GA which is employed for the correction of the quantization step is calculated according to Expression (12) which employs the level of visual attention G of the macroblock and the activity $N\_{act}$ representing the level of perceptual distortion.

$$GA = G' \times N\_{act} \quad (12)$$

The value of coefficient GA in Expression (12) takes a smaller value than one in a macroblock with a flat image pattern and a high level of visual attention, whereas GA takes a larger value than one in a macroblock with a non-flat image pattern and a low level of visual attention.

The coefficient for the correction of the quantization step may be obtained by expressions other than Expression (12), which is not a limiting example.

In the above embodiment, the value of G' is set so that G' is larger than one when the level of visual attention is higher than other blocks while G' is smaller than one when the level of visual attention is smaller than one. The value of G', which is employed for the comparison of the level of visual attention of a specific block with that of another block, is, however, not limited to (1.5-G). The same applies to the value of G' employed in a modification described later.

Next, quantization step QP is obtained via the correction of quantization step QP', which is supplied as quantization step data from the quantization step correcting unit 133, with the coefficient GA. A specific value of quantization step QP is calculated based on Expression (13):

$$QP = GA \times QP' \quad (13)$$

When the calculated quantization step QP is not an integer, the calculated value is rounded to an integer. The manner of rounding is not limited to rounding off and the value may be rounded up or rounded down to the nearest integer.

With Expression (13), the quantization step is relatively small for a macroblock with a flat image pattern and a high level of visual attention, whereas the quantization step is relatively large for a macroblock with a non-flat image pattern and a low level of visual attention.

Then, the quantization processing unit 122 quantizes the supplied TC data based on the quantization step corrected in step S304.

The quantization manner is not limited to the manner describe above in the embodiment. In particular, the order of steps S301, S302, and S303 is not limited and these steps may be performed in parallel.

According to the processing as described above, the subjective image quality of the target area can be enhanced since the quantization step of the macroblock with a high level of visual attention is corrected to be smaller prior to the quantization. Further, since the quantization step for the macroblock, which has a flat image pattern that is easily perceived though the level of visual attention is low, is corrected with GA set closer to one, the corrected quantization step does not become excessively large. Thus, easily perceivable image distortion can be reduced in the non-target area in an image after the quantization. Thus, the coding distortion in the flat area, which is more readily perceived, is reduced to enhance the subjective image quality of the target area.

Figure 4:
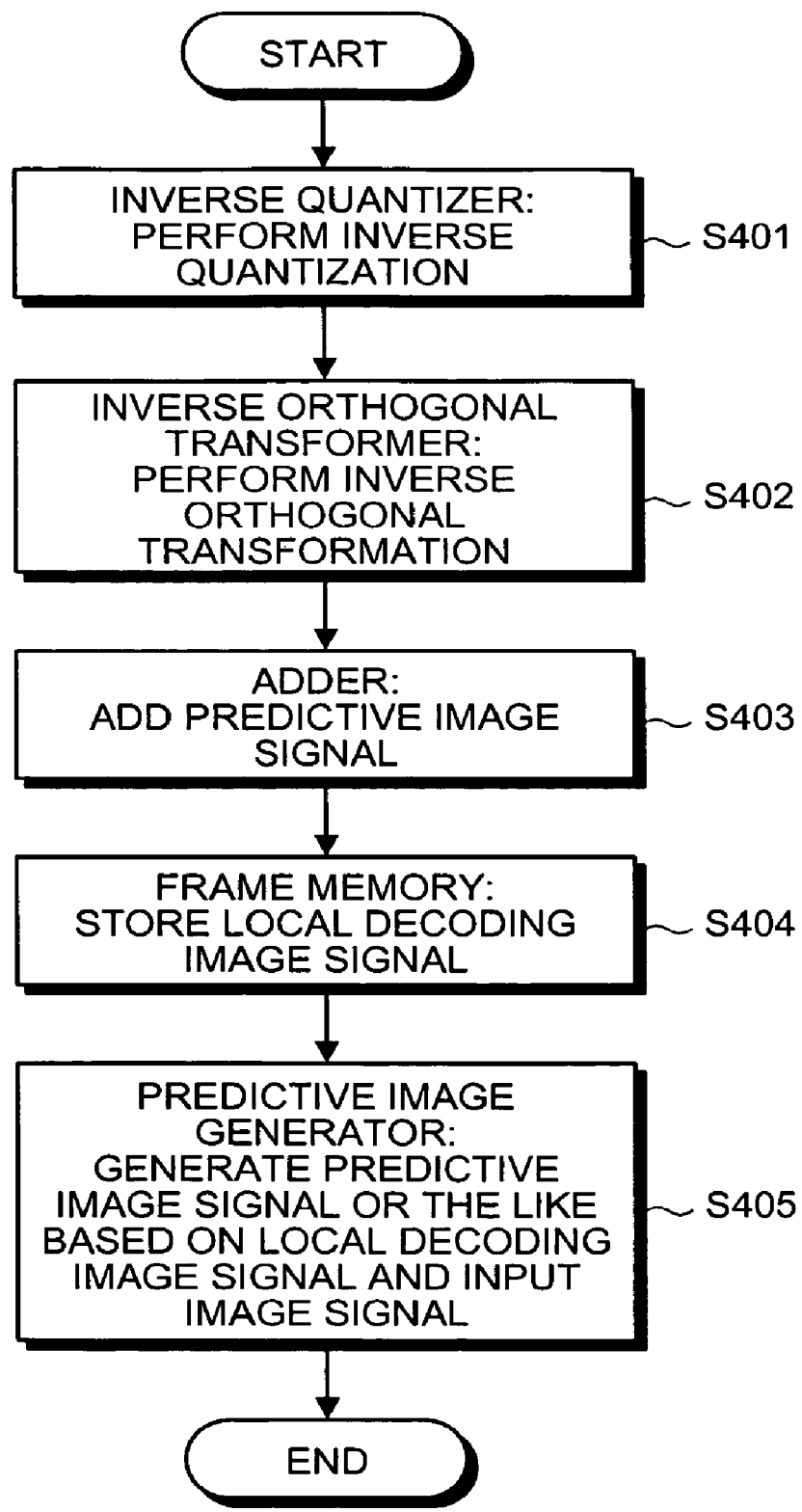
FIG. 4 is a flowchart of an overall process up to generation of a predictive image signal from data of quantized transformation coefficient according to the embodiment.

Next, generation of the predictive image signal from the quantized TC data is described. FIG. 4 is a flowchart of an overall process of the generation of the predictive image signal from the supplied quantized TC data according to the embodiment.

The inverse quantizer 106 performs inverse quantization by multiplying the quantized TC data supplied from the quantizer 103 by the quantization step for each macroblock (step S401). Then, the inverse orthogonal transformer 107 performs inverse orthogonal transformation on the resulting data (step S402).

Next, the adder 108 adds the predictive image signal supplied from the predictive image generator 110 to the resulting data after the inverse orthogonal transformation in step S402, to generate a local decoding image signal (step S403). The frame memory 109 stores the local decoding image signal (step S404).

The predictive image generator 110 matches the input image signal and the local decoding image signal stored in the frame memory 109 for each macroblock in a frame to generate the predictive image signal (step S405). The predictive image generator 110 outputs the generated predictive image signal together with the selected motion vector data and the prediction mode data.

The motion vector data and the prediction mode data selected according to the process sequence described above are encoded together with the quantized TC data by the entropy coder 104. Since the subtractor 101 performs subtraction on the input image signal to provide the predictive image signal, the reduction in data amount is allowed. Further, the generation of the local decoding image signal is allowed with the adder 108 which adds the predictive image signal to the data after the inverse orthogonal transformation.

In the embodiment, the activity is employed as a value to indicate the level of perceptual distortion of the macroblock. However, any value can be employed as such as far as the value indicates the easiness of perception of distorted image quality caused by the image coding. Other calculation manners may be employed, for example, based on γ characteristic, characteristic that distortion is more easily perceived when the average value of luminance is low, or any other perceptual characteristics. The above mentioned features may be employed in combination for the calculation of the level of perceptual distortion.

Similarly, the manner of calculation of activity is not limited to the one using Expression (9). The activity may be calculated, for example, via division of a macroblock into four parts and use of a minimum value of luminance variance in each divided block as $V_y$.

Further, though a pair of the prediction mode and the quantization step is selected for each macroblock which is employed as the coded block of the present invention, the above is not a limiting example and a different unit may be employed, e.g., based on plural macroblocks, slice, field, frame, picture, or group of picture (GOP).

Further, though in the embodiment the coding is performed on the dynamic image, the present invention is applicable to the coding of the static image or the multiple-viewpoint image.

The present invention is not limited to the embodiment as described above and is modifiable as illustrated below.

First, a first modification of the embodiment is described. In the embodiment, the quantization step correcting unit 133 corrects the quantization step based on the product of the quantization step QP' and the coefficient GA according to Expression (13). However, the quantization step QP may be calculated according to an expression with a similar characteristic.

For example, the quantization step may be calculated based on Expression (14):

$$QP = K \cdot \log_L(GA) + QP' \quad (14)$$

Here, L is a real number equal to or larger than one, and K needs to be a positive real number. When Expression (14) is to be applied to ITU-T H.264/ISO/IEC MPEG-4 Part 10 (AVC), desirable values would be L=2 and K=6. When the resulting quantization step QP is not an integer, the result is rounded off, up, or down to the nearest integer. Then, the same effect as is obtained with Expression (13) of the embodiment is obtained with Expression (14). In other words, h the coding distortion in the flat area which is easily perceived can be reduced whereby the subjective image quality in the target area can be enhanced.

Further, though in the embodiment Expression (12) is employed to set the coefficient GA, in still another modification the value of GA may be set based on a different calculation manner. For example, GA may be obtained based on the size of G' in comparison with one (i.e., whether G'<1 or G'=1).

For example, GA is set to G' when G'=1, whereas GA is set to $N_{act}$ when G'<1.

Alternatively, GA can be set to $N\_{act}$ when G'=1, whereas GA can be set to G' when G'<1.

Still alternatively, GA can be set to G'×$N\_{act}$ when G'=1 whereas GA can be set to $N\_{act}$ when G'<1.

Still alternatively, GA can be set to $N\_{act}$ when G'=1 whereas GA can be set to G'×$N\_{act}$ when G'<1.

Here, the process performed when G'<1 corresponds to a first correcting process and the process performed when G'=1 corresponds to a second correcting process. Further, the reference value for changing the types of process is not limited to one and can take any value.

Specifically, GA can be set to G'×$N\_{act}$ when G'=1, G'×$N\_{act}$ when G'<1 and $N\_{act}$<1, and G' when G'<1 and $N\_{act}$=1.

Here, the processing performed when $N\_{act}$<1 as described above corresponds to correcting of the level of perceptual distortion. In the above described process, GA is set to G' when $N\_{act}$=1 and $N\_{act}$ is not employed. Needless to say, the present invention is not limited to such processing manner and a different manner from the one described above is employable when $N\_{act}$<1 with the use of $N\_{act}$.

When GA is found based on the method as described above and the quantization step is calculated as in the embodiment or in the first modification, followed by the quantization, the easily perceivable coding distortion in the flat area can be reduced and the subjective image quality in the target area can be enhanced.

Thus, since the quantization is performed after the correction of the quantization width data with the use of the data on the level of visual attention and the level of perceptual distortion, following inconvenience can be prevented. When the correction is conducted based only on the data on the level of visual attention, the image quality distortion is increased in a non-targeted area with easily perceivable distortion. In addition, when the correction is conducted based only on the data on the level of perceptual distortion, the image quality is lowered in a target area whose distortion is not easily perceived. With the processing as described above, such inconveniences are prevented and appropriate data on quantization width is set for an area which is targeted and whose distortion is easily perceived. Thus, the coding distortion of image quality in an area whose distortion is easily perceived can be reduced, whereby the subjective image quality of an area which is visually focused by a human viewer can be enhanced.

Here, the image coding program to be executed by the image coding apparatus of the embodiment is embedded in advance into a storage unit such as a read only memory (ROM).

The image coding program to be executed by the image coding apparatus of the embodiment may be provided in a form of an installable or an executable file recorded in a computer readable recording medium such as a compact disc read only memory (CD-ROM), a flexible disc (FD), a compact disc recordable (CD-R), or a digital versatile disk (DVD).

Further, the image coding program to be executed by the image coding apparatus of the embodiment may be stored in a computer connected to a network such as the Internet, and downloaded via the network. Still further, the image coding program to be executed by the image coding apparatus of the embodiment may be provided or distributed via a network such as the Internet.

The image coding program to be executed by the image coding apparatus of the embodiment is constructed as a module including respective components described above (i.e., the subtractor, the orthogonal transformer, the quantizer, the entropy coder, the quantization controller, the inverse quantizer, the inverse orthogonal transformer, the adder, the frame memory, and the predictive image generator). In an actual hardware, a central processing unit (CPU: processor) reads out the image coding program from the ROM to execute the same, thereby loading the respective components described above into a main memory unit. Thus, the subtractor, the orthogonal transformer, the quantizer, the entropy coder, the quantization controller, the inverse quantizer, the inverse orthogonal transformer, the adder, the frame memory, and the predictive image generator are generated on the main memory unit.

As is clear from the foregoing, the image coding apparatus, the image coding method, and the program product for image coding according to the embodiment is useful for an apparatus which perform an image coding, and in particular, suitable for an apparatus for coding a dynamic image which sets an appropriate quantization step to perform quantization for the enhancement of the image quality.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for coding an image, comprising:
   a setting unit that sets a quantization width for each coded block of an image frame of image data;
   a visual attention calculating unit that calculates for each coded block a level of visual attention for a first element, the level of visual attention taking a value in a range between a maximum value and a minimum value thereof in the image frame;
   a perceptual distortion calculating unit that calculates for each coded block a level of perceptual distortion for a second element whose distorted image quality is easily visually perceived, the level of perceptual distortion taking a value in a range between a maximum value and a minimum value thereof in the image frame;
   a correcting unit that corrects the quantization width to a value obtained as a result of a multiplication in which a product of the level of visual attention and the level of distorted precision is multiplied by the quantization width set by the setting unit; and
   a quantizing unit that quantizes the image data based on the corrected quantization width.

2. An apparatus for coding an image, comprising:
   a setting unit that sets a quantization width for each coded block of an image frame of image data;

a visual attention calculating unit that calculates for each coded block a level of visual attention for a first element, the level of visual attention taking a value in a range between a maximum value and a minimum value thereof in the image frame;

a perceptual distortion calculating unit that calculates for each coded block a level of perceptual distortion for a second element whose distorted image quality is easily visually perceived, the level of perceptual distortion taking a value in a range between a maximum value and a minimum value thereof in the image frame;

a correcting unit that corrects the quantization width to a value obtained as a result of an addition in which the quantization width is added to a product of a predetermined positive real number and a predetermined logarithm of a product of the level of visual attention and the level of perceptual distortion, the base of the logarithm being a real number equal to or larger than one; and a quantizing unit that quantizes the image data based on the corrected quantization width.

3. A method for coding an image, comprising:

setting a quantization width for each coded block of an image frame of image data;

calculating for each coded block a level of visual attention for a first element, the level of visual attention taking a value in a range between a maximum value and a minimum value thereof in the image frame;

calculating for each coded block a level of perceptual distortion for a second element whose distorted image quality is easily visually perceived, the level of perceptual distortion taking a value in a range between a maximum value and a minimum value thereof in the image frame;

correcting the quantization width to a value obtained as a result of a multiplication in which a product of the level of visual attention and the level of distorted precision is multiplied by the quantization width set by the setting; and quantizing the image data based on the corrected quantization width.

4. A method for coding an image, comprising:

setting a quantization width for each coded block of an image frame of image data;

calculating for each coded block a level of visual attention for a first element, the level of visual attention taking a value in a range between a maximum value and a minimum value thereof in the image frame;

calculating for each coded block a level of perceptual distortion for a second element whose distorted image quality is easily visually perceived, the level of perceptual distortion taking a value in a range between a maximum value and a minimum value thereof in the image frame;

correcting the quantization width to a value obtained as a result of an addition in which the quantization width is added to a product of a predetermined positive real number and a predetermined logarithm of a product of the level of visual attention and the level of perceptual distortion, the base of the logarithm being a real number equal to or larger than one; and quantizing the image data based on the corrected quantization width.

5. An apparatus for coding an image, comprising:

a setting unit that sets quantization width for each coded block of an image frame of image data;

a visual attention calculating unit that calculates for each coded block a level of visual attention for a first element, the level of visual attention taking a smaller value than one in a coded block with a higher level than other levels of coded blocks, and taking a larger value than one in a coded block with a smaller level of coded block than other levels of coded blocks, levels of coded blocks being set based on at least one of elements including value, color saturation of an average color value of pixels and hue of an average color value of pixels;

a perceptual distortion calculating unit that calculates for each coded block a level of perceptual distortion for a second element whose distorted image quality is visually perceived, the level of perceptual distortion taking a smaller value than one when the variance of the input image of the coded block is less than average, and taking a larger value than one when the variance of the input image of the coded block is more than average;

a correcting unit that corrects the quantization width to a value obtained as a result of a multiplication in which a product of the level of visual attention and the level of distorted precision is multiplied by the quantization width set by the setting unit; and a quantizing unit that quantizes the image data based on the corrected quantization width.

* * * * *